(12) United States Patent
Tyvaert et al.

(10) Patent No.: US 6,604,352 B1
(45) Date of Patent: Aug. 12, 2003

(54) CROP PROCESSOR AND BLOWER ARRANGEMENT FOR A FORAGE HARVESTER

(75) Inventors: Paul C. Tyvaert, Poesele (BE); Dirk J. Desnijder, Wondelgem (BE)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 10/129,182

(22) PCT Filed: Nov. 9, 2000

(86) PCT No.: PCT/EP00/11124

§ 371 (c)(1),
(2), (4) Date: May 2, 2002

(87) PCT Pub. No.: WO01/37633

PCT Pub. Date: May 31, 2001

(30) Foreign Application Priority Data

Nov. 11, 1999 (GB) .............................................. 9926580

(51) Int. Cl.[7] .............................................. A01D 61/00
(52) U.S. Cl. .................................................. 56/16.4 B
(58) Field of Search ........................ 56/16.4 B, 16.5, 56/501, 153, 208, 212, 213

(56) References Cited

U.S. PATENT DOCUMENTS

| | | | | |
|---|---|---|---|---|
| 4,747,260 A | * | 5/1988 | Petrasch et al. | 56/505 |
| 4,949,535 A | * | 8/1990 | Hurlburt | 56/16.4 R |
| 5,498,207 A | * | 3/1996 | Cappon et al. | 460/119 |
| 6,145,767 A | * | 11/2000 | Hostettler | 241/135 |
| 6,425,232 B1 | * | 7/2002 | Desnijder et al. | 56/16.4 B |

* cited by examiner

Primary Examiner—Robert E. Pezzuto
Assistant Examiner—Alicia Torres
(74) Attorney, Agent, or Firm—John William Stader; Rebecca L. Henkel

(57) ABSTRACT

A forage harvester having a crop processor unit, a cutter unit operable to comminute crop material and a processor unit movably disposed between first and second positions. In the first position, the processing unit receives comminuted crop material from the cutter unit. In the second position, comminuted crop material from the cutter unit bypasses the crop processor unit. A blower unit is disposed to move with the crop processor between the first and second positions, the blower unit receiving the processed crop material directly form the crop processor unit when in the first position and directly from the cutter unit when in the second position, in both cases accelerating the processed crop material towards a handling apparatus.

6 Claims, 7 Drawing Sheets

CROP PROCESSOR AND BLOWER ARRANGEMENT FOR A FORAGE HARVESTER

TECHNICAL FIELD

The present invention relates generally to forage harvesters having means for processing crop material including maize kernels, these means, for instance, comprising a compressor roll assembly, operable to crack the maize kernels as well as means for processing kernel-free crops such as alfalfa or grass.

TECHNICAL BACKGROUND

A forage harvester is an agricultural machine for comminuting crop material for silage purposes. A harvester is mainly used to harvest grass and maize. With grass-like materials (kernel-free) it is sufficient to slit the crop material, e.g. the stems of the plants are cut to length using a cutter, e.g. a rotating knife drum. When cutting maize the cobs may be slit into smaller size but the majority of the kernels are not broken or cracked. This reduces the nutrient value of the silage crop as the kernels are more-or-less indigestible if not cracked. A cutterhead unit of a forage harvester is used to receive crop material harvested from the field and comminute it into forage which is fed by a blower or accelerator to a temporary container, before being stored and eventually foddered to livestock. In order to facilitate the complete digestion of the crop material, including the maize kernels, the outer skin of the kernels has to be cracked or cut. This can be done by a set of closely adjacent, co-operating compressor rolls with fluted surfaces, installed in front of the blower or accelerator, as shown for example in EP-A-0 177 995 or EP-A-0 664 077.

When chopping maize, forage harvesters make use of the crop processor to crack the kernels in order to obtain a higher nutrient value of the chopped material. In that case the chopped material is thrown by the cutterhead into the crop processor, which processes (cracks) the kernels and transfers the material with sufficient speed into a blower or accelerator, which in its turn ejects the crop into a trailer or container. When chopping other kernel-free crops such as grass or alfalfa, the crop processor is redundant but the rolls may still be worn by the sand/earth in the crop material and damaged by stones therein. It is often removed from the material flow by physically removing it from the machine. In that case the chopped material is thrown immediately by the cutterhead into the blower or accelerator and as such it has to travel over a longer distance without intermediate acceleration. In a number of conditions, especially with light or sticky crops, this can result in poor crop transport from cutterhead to the blower or accelerator due to lack of kinetic energy of the material, causing blockage of the channel between cutterhead and blower or accelerator.

To remove the crop processor from the crop path various methods have been proposed. According to DE 34 07 333 the distance between the rolls is increased to leave a gap between the rolls. Alternatively, the complete crop processor may be removed as known from DE 40 0 888. As yet another alternative, the crop processor may remain in the harvester but means are provided for shifting the crop processor unit between an active position, in which it registers with a duct from the cutterhead and an inactive position, behind the duct. Such a system is known from DE 42 15 696. In DE 195 38 199 it is proposed not to remove the crop processor rolls but to change the direction of crop flow by means of a deflector plate.

All these known solutions have the problem in common that when the crop processor is removed or in an inactive condition the distance from the cutterhead to the blower or crop accelerator is large. Under adverse conditions the long duct between the cutterhead and the blower can become blocked.

DE 196 03 928 proposes to solve this problem with an intermediate impeller. This increases the cost and power consumption of the harvester. In addition, the change requires a change of belt drive which prevents the changeover being carried out from the drive cab. DE 32 34 657 suggests to shift a blower-crop processor combination sideways so that the chopped crop material is either first processed in the crop processor and passed sideways to the blower or, alternatively, passed directly to the blower. The sideways movement moves a pulley for driving the combination to one side thus requiring a belt change. Further, a hatch from the blower has to be removed to provide an inlet for the crop material and a further hatch installed to close the opening left in the crop processor. This means the changeover cannot be carried out from the drive cab. Also it is difficult to prevent some crop material from accumulating in the crop processor when it is in the inactive position.

It is an objective of the present invention to provide a better arrangement for introducing compressor rolls into the stream or removing the same therefrom.

SUMMARY OF THE INVENTION

According to the invention, a forage harvester is provided having a crop processor unit for handling crop material including kernels, the forage harvester comprising:

a cutter unit for comminuting said crop material; and a processing unit which is movable between a first and a second position, said unit comprising:

a crop processor unit disposed adjacent said cutter unit for receiving comminuted crop material from the cutter unit and cracking kernels in the crop material when said processing unit is in said first position, and disposed remote from said cutter unit for letting the comminuted crop material from the cutter unit bypass the crop processor unit when said processing unit is in said second position;

a blower unit for accelerating the processed crop material towards a subsequent handling apparatus, the blower unit being disposed for receiving the processed crop material directly from the crop processor unit when the processing unit is in said first position and for receiving the crop material directly from the cutter unit when the processing unit is in the second position; and a first drive power connection from a power unit for providing drive power to at least one of the blower unit and the crop processor unit, the power unit being remote from the processing unit, characterised in that:

said movable processing unit further comprises a frame which is rotatably journalled at one point, said blower unit being mounted to said frame;

said frame being connected to said crop processor unit for moving therewith as the processing unit is moved from the first to the second position; and said first drive power connection to the at least one of the blower unit and the crop processor unit is operable to remain substantially operational as the processing unit is moved from the first to the second position.

According to a preferred embodiment of the present invention, the power unit may be the prime mover of the harvester or of a tractor which tows the harvester, e.g. a power take-off on the tractor. According to another embodiment of the present invention, the first drive connection is provided by a belt drive. The power unit may be a hydraulic pump or an electric power supply. The first drive connection may be a flexible hydraulic feed from a hydraulic pump or a flexible cable from an electric power supply. The term "substantially operational" includes minor changes to the drive connection, e.g. re-adjustment of an idler roller but excludes major changes such as changing a belt drive. Preferably, the crop processor unit comprises a compressor roll assembly including a set of closely adjacent co-operating compressor rolls and the blower unit comprises an axle and a suitable blower rotor attached to the axle. Preferably, the axis of the compressor rolls and the axle of the blower unit are parallel but the present invention is not limited thereto. The axis of rotation of the processing unit is preferably parallel to the axis of the compressor rolls.

Preferably, the distance from the output of the cutter unit to the input of the crop processor unit in the first position is about the same as the distance from the output of the cutter unit to the input of the blower unit when the crop processor unit is in the second position. When this is the case there is a reduced chance that comminuted crop material from the cutter units blocks or jams in the chute or duct leading to the blower unit when the crop processor unit is bypassed. Preferably, the blower unit and the crop processor unit are mounted in a frame such that rotation of this frame between the first and second positions is permitted without the removal or disassembly of any drive component of the processing unit, e.g. removal or changing of belt drives or gears. In accordance with one embodiment the crop processor rolls are raised from a low non-crop engaging position to a higher crop engaging position. In the lower position a guide plate may be positioned to isolate the crop processor unit from the blower unit and/or the duct leading to the blower unit.

The forage harvester in accordance with the present invention may be self-propelled or may be towable by a tractor.

According to a further aspect of the present invention, a method is provided of operating a forage harvester, the harvester having a processing unit comprising a crop processor unit for handling crop material including kernels and a blower unit mounted to a frame which is rotatably journalled at one point, the frame being connected to said crop processor unit, the method comprising the steps of:

driving at least one of the crop processor unit and the blower unit in a first position of the processing unit through a first drive power connection from a power unit, so that the crop processor unit receives crop material gathered by the forage harvester and cracks kernels in the crop material;

moving the processing unit to a second position in which the crop material bypasses the crop processor unit and at the same time rotating the frame to move the blower unit towards the cutter unit;

accelerating the processed crop material with the blower unit; and maintaining the first drive power connection to the at least one of the crop processor unit and the blower unit substantially operational as the processing unit is moved from the first to the second position.

A forage harvester and a method of its operation in accordance with the present invention will now be described in greater detail, by way of example, with reference to the following drawings.

DETAILED DESCRIPTION OF THE ILLUSTRATIVE EMBODIMENTS

The present invention will be described with reference to certain embodiments and certain drawings but the invention is not limited thereto but only by the claims. The drawings are schematic. The terms "front", "rear", "forward", "rearward", "right" and "left" used throughout the specification are determined with respect to the normal direction of movement of the machine in operation and are not to be construed as limiting terms.

Figure 1:
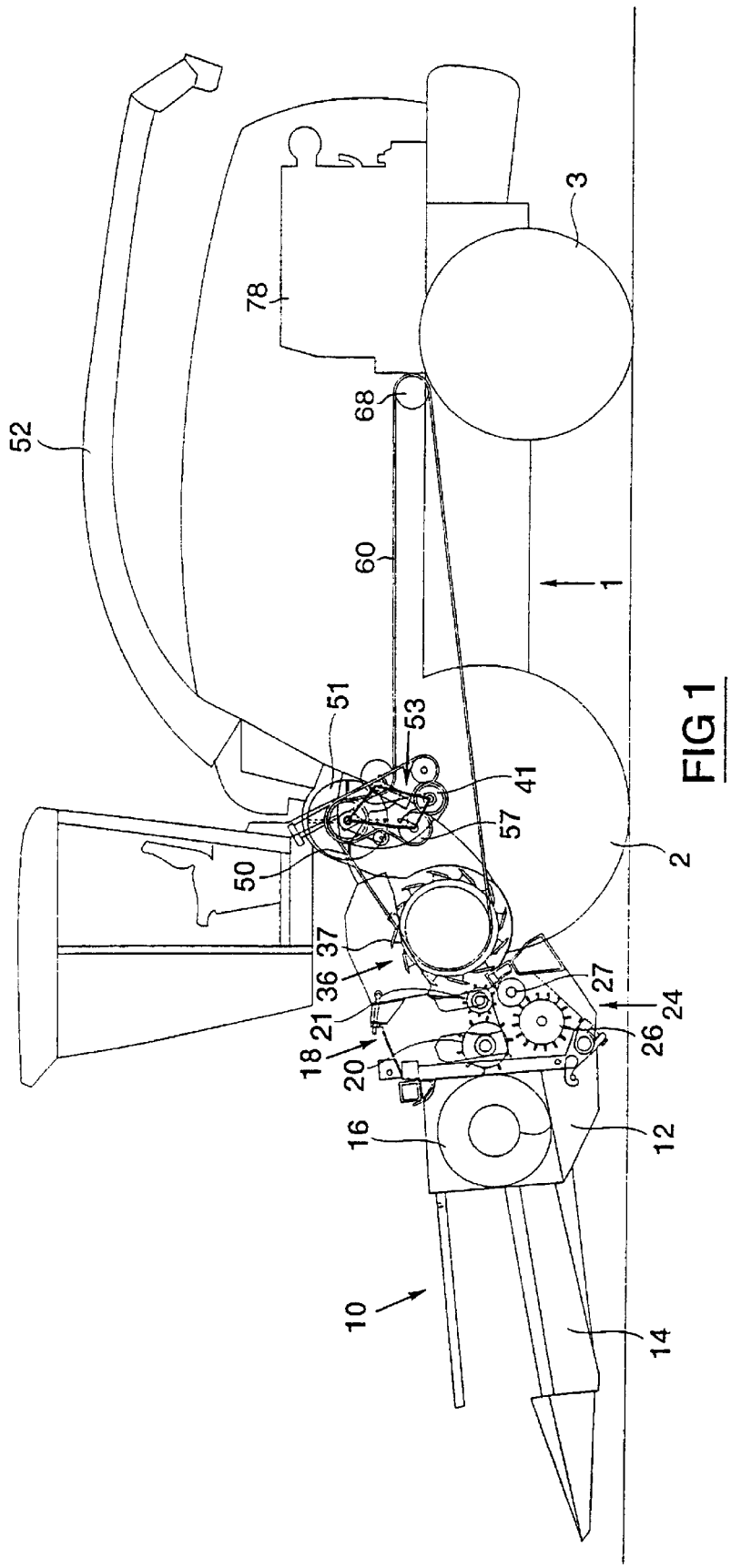
FIG. 1 is a side elevational view of a forage harvester, comprising a front unit, mounted to a main frame and a crop processing apparatus.

With reference to the drawings and more particularly to FIG. 1, there is shown a forage harvester having a main frame 1 on which are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

The forage harvester has feeding means which comprise lower feeder means, including a forward lower feed roll 26, and a smooth, rear lower feed roll 27, and upper feeder means, including an upper forward feed roll 20 and an upper rear feed roll 21. The lower feed rolls 26, 27 are rotatably mounted in a lower feeder frame 24 and the upper feed rolls 20, 21 are mounted in an upper feeder frame 18, to which the row crop attachment 10 is attached. The upper and lower feeder means rotate to convey the crop material in-between to a cutterhead 36, which comprises a plurality of knives 37, generating a cylindrical peripheral shape or profile, when the cutterhead 36 is rotated.

The knives 37 co-operate with a fixed shearbar to cut the crop material to length. A crop processor roll assembly 41 is provided comprising a set of counter-rotating compressor rolls 57 mounted therein, which rolls crack the kernels which are left in the chopped material. The compressor rolls 57 may have a substantially cylindrical, fluted surface. The crop processor roll assembly 41 and a blower rotor 51 are movable as a functional unit between a first position and a second position as will be described later. In a first position the cutter head 36 projects the cut material into the bite of the crop processor roll assembly 41. This delivers the crushed maize kernels to the blower rotor 51 which is installed within a blower housing 48. The blower rotor 51 comprises a plurality of paddles 50, which throw the material upwardly through the blower or accelerator outlet into a discharge spout 52, which can be positioned by an operator to direct the cut crop material as required, normally into a wagon which is moving alongside or behind the forage harvester. In a second position the crop processor roll assembly 41 is moved out of the path of the comminuted crop stream and replaced with the blower rotor 51 so that the comminuted material from the cutterhead 36 is thrown directly into the blower rotor 51 (described below) and from there into the discharge spout.

Figure 2:
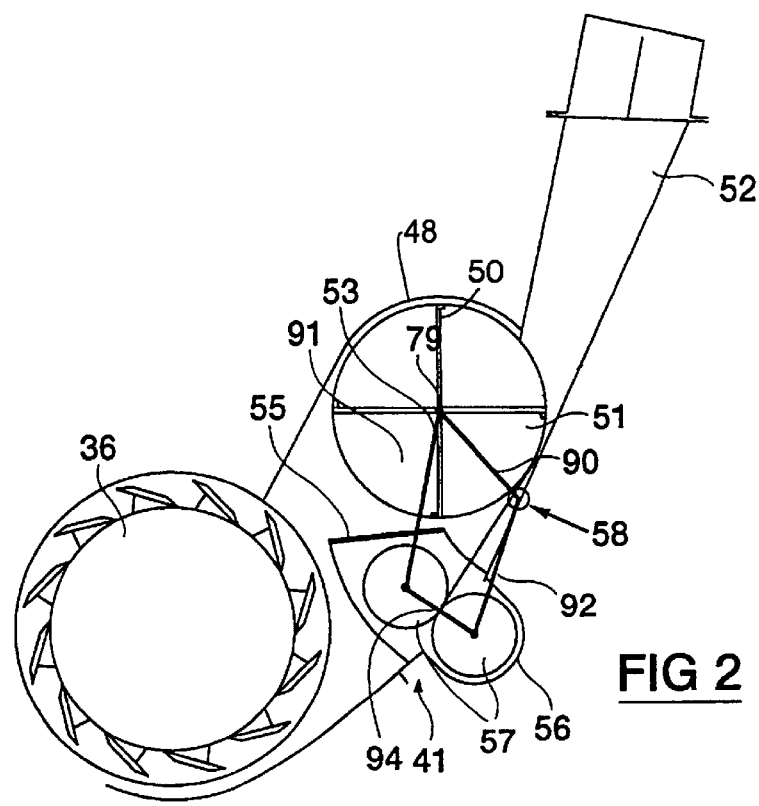
FIG. 2 is a detailed side view of a compressor roll assembly in an active position according to an embodiment of the present invention.
Figure 3:
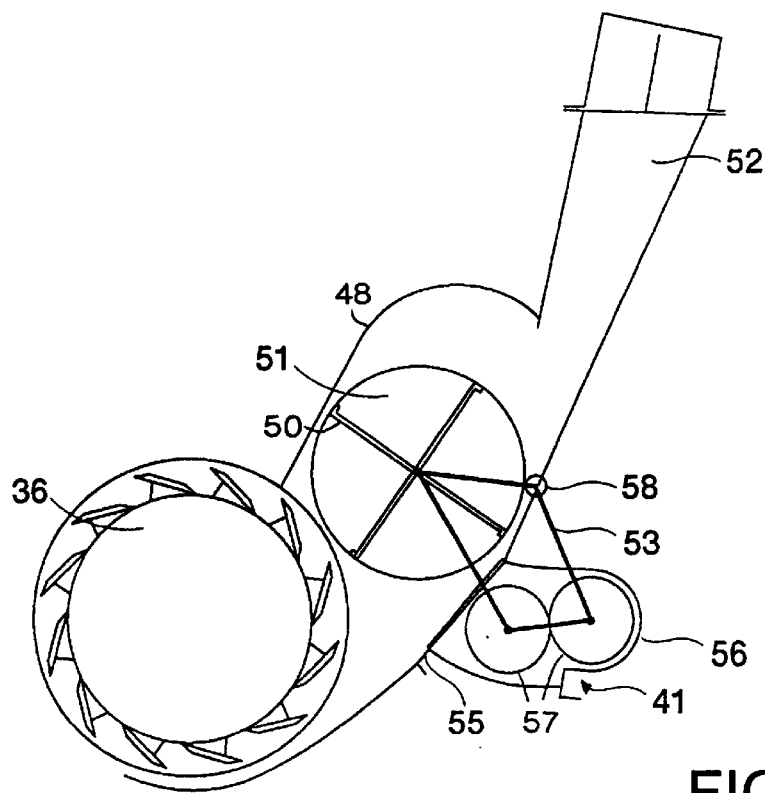
FIG. 3 is a detailed side view of the compressor roll assembly of FIG. 2 in an inactive position.

A detailed arrangement of the functional unit of the crop processor and the blower in accordance with an embodiment of the present invention is shown in FIGS. 2 and 3.

The present invention comprises a forage harvester where the blower 51 and crop processor assembly 41 are assembled into one functional processing unit, e.g. are all attached to a frame 53 that pivots around a pair of mutually opposed stub shafts 58 which are journalled in the main frame 1. The frame 53 is represented schematically in FIGS. 2 and 3. The space between the stub shafts 58 allows passage of the crop material. When using the crop processor, the blower and crop processor are positioned as in FIG. 2. When the crop processor function is not needed, the whole accelerator/crop processor assembly is pivoted around the stub shafts 58 until it reaches the position as indicated in FIG. 3. By doing this, the blower is moved very close to the cutterhead 36, thus minimising the distance between cutterhead and blower and as a consequence, avoiding possible crop blockage in the channel between cutterhead and the blower. Frame 53 also contains two guide plates 55 and 56, which automatically close the transport channel between the cutterhead and the blower in both positions.

Figure 4:
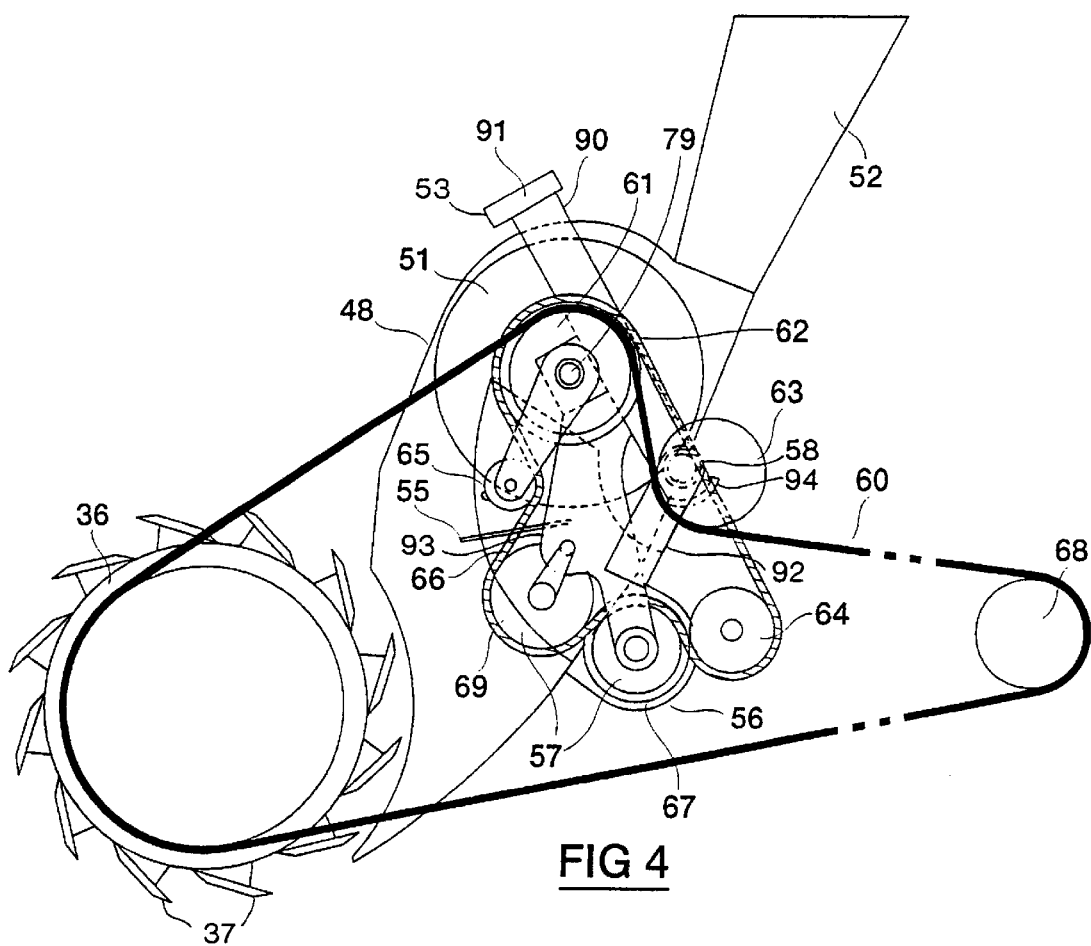
FIG. 4 is a side view of the compressor roll assembly of FIG. 2 showing drive belts.
Figure 5:
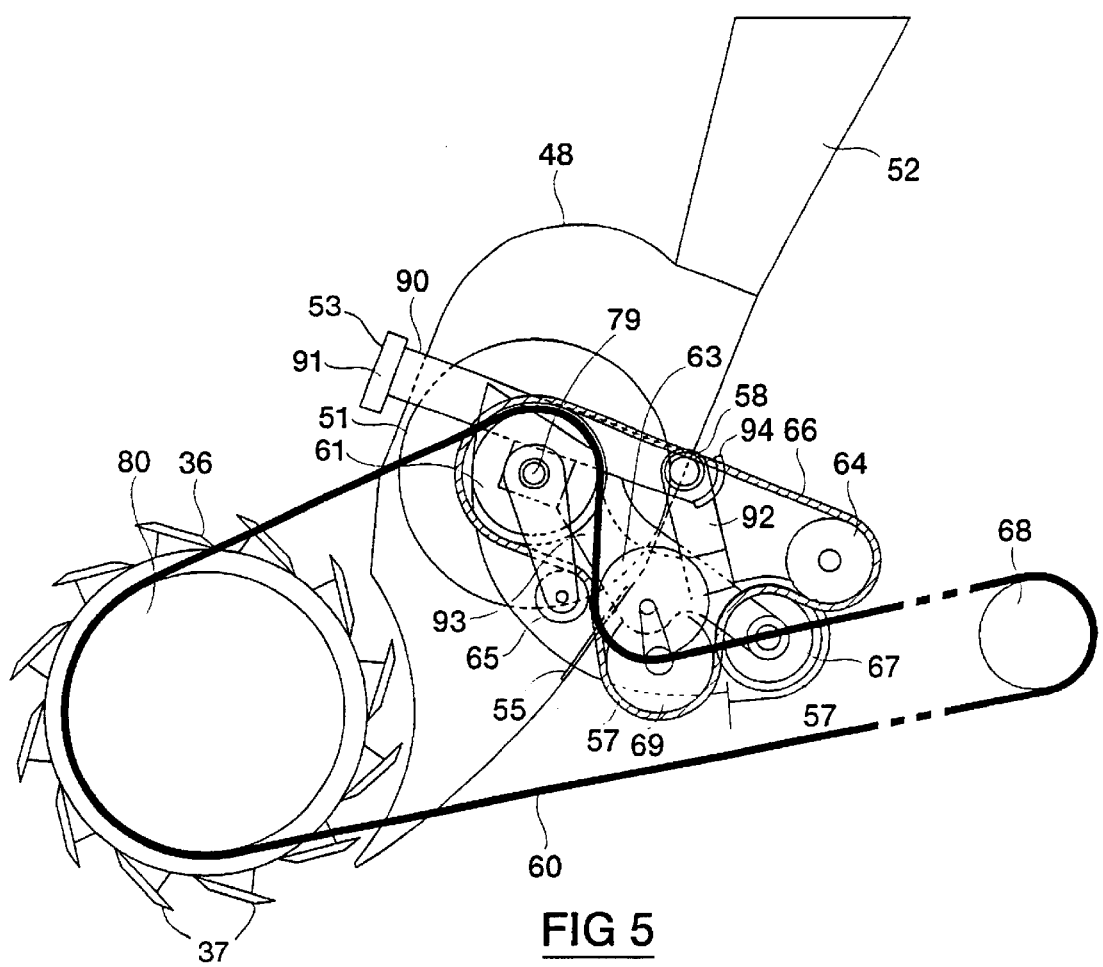
FIG. 5 is a side view of the compressor roll assembly of FIG. 3 showing the drive belts.

The crop processor rolls 57 and the blower 51 are assembled onto the frame 53 to form a functional unit. Frame 53 is rotatably journalled to the main frame 1 by means of stub shafts 58. The frame 53 may be moved by a suitable actuator, e.g. a hydraulic cylinder (not sown). As shown in FIGS. 4 and 5, the frame 53 comprises a pair of struts 90 arranged on both sides of the blower housing 48 and connected to the stub shafts 58. The upper ends of the struts 90 are interconnected by a transverse beam 91. The blower axle 79 is supported in a pair of bearing blocks fixed, e.g. bolted or welded, to the front faces of the struts 90. The transverse beam 91 provides the necessary structural rigidity to the frame 53. This frame 53 further comprises a second transverse beam 94 interconnecting the struts 90 below stub shafts 58 and a pair of downwardly extending struts 92 which are connected to the struts 90 adjacent stub shafts 58. The processor rolls 57 are journalled in a pair of bearing plates 93 which are connected to the upward and downward struts 90, 92. The plats are arranged on both sides of the blower housing 48 and may also carry the journals of an idler roller 64. Most advantageously, the bearing plates are removably connected, e.g. by bolts, to the struts 90, 92. This allows complete removal of the crop processor roll assembly 41 after the maize season, such that no power has to be provided to rotate the idler crop reprocessor rolls 57. In the normal working condition the frame 53 is constituted by the struts 90, 92, the transverse beams 91, 94 and the bearing plates 93.

crop processor rolls 57 and the blower 51 may be driven by a common belt drive which is driven by a drive unit 78. In one embodiment (not shown), the crop processor rolls and the blower may be driven via a pulley mounted on an axle which coaxial with or near the stub shafts 58 of the frame 53. The length of the common drive belt then remains substantially constant during movement of the frame. There is no substantial length change so that displacements are small enough to be absorbed by small movements of an idler roller such as 63. The idler roller may be spring-loaded so that the accommodating displacement thereof is automatic or the idler roller may be adjusted by hand. Hence, there is no requirement for changing of belts or gears or for demounting the processor rolls 57 when changing the position of the blower and the crop processor.

When the crop processor rolls 57 are in the upper crop-engaging position (FIGS. 2 and 4), the comminuted crop material from the cutterhead 36 is led to the bite of the compressor rolls 57 by a horizontal part of the lower guide plate 56, which is attached to the frame 53. The second guide plate 55 is in an upward position free of the crop material trajectory. Second guide plate 55 is also attached to frame 53. When the crop processor rolls 57 are in the lower non-engaging position (FIGS. 3 and 5), second guide plate 55 is positioned to block any aperture in the duct between the cutterhead 36 and the blower 51 thus guiding the comminuted crop material from the cutterhead 36 to the blower 51.

The outer housing 48 of the blower 51 and the crop processor rolls 57 is attached to the main frame 1 and provides sufficient internal space to accommodate the movement of the blower 51 in both operating positions.

Figure 6:
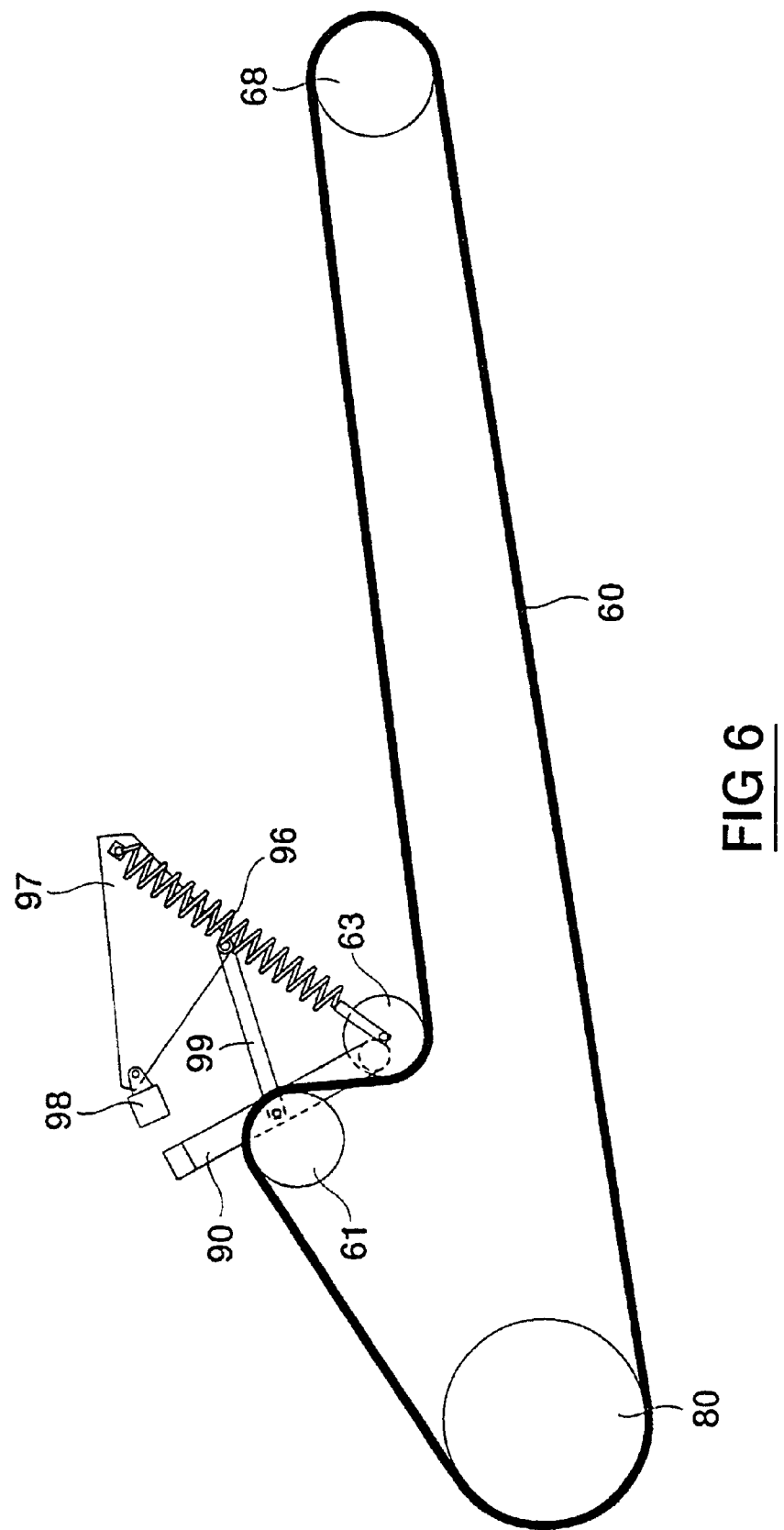
FIGS. 6 and 7 show the operation of a spring-loaded idler pulley to tension the main belt drive in accordance with an embodiment of the present invention when the crop processor assembly is in the position of FIGS. 2 and 3, respectively.
Figure 7:
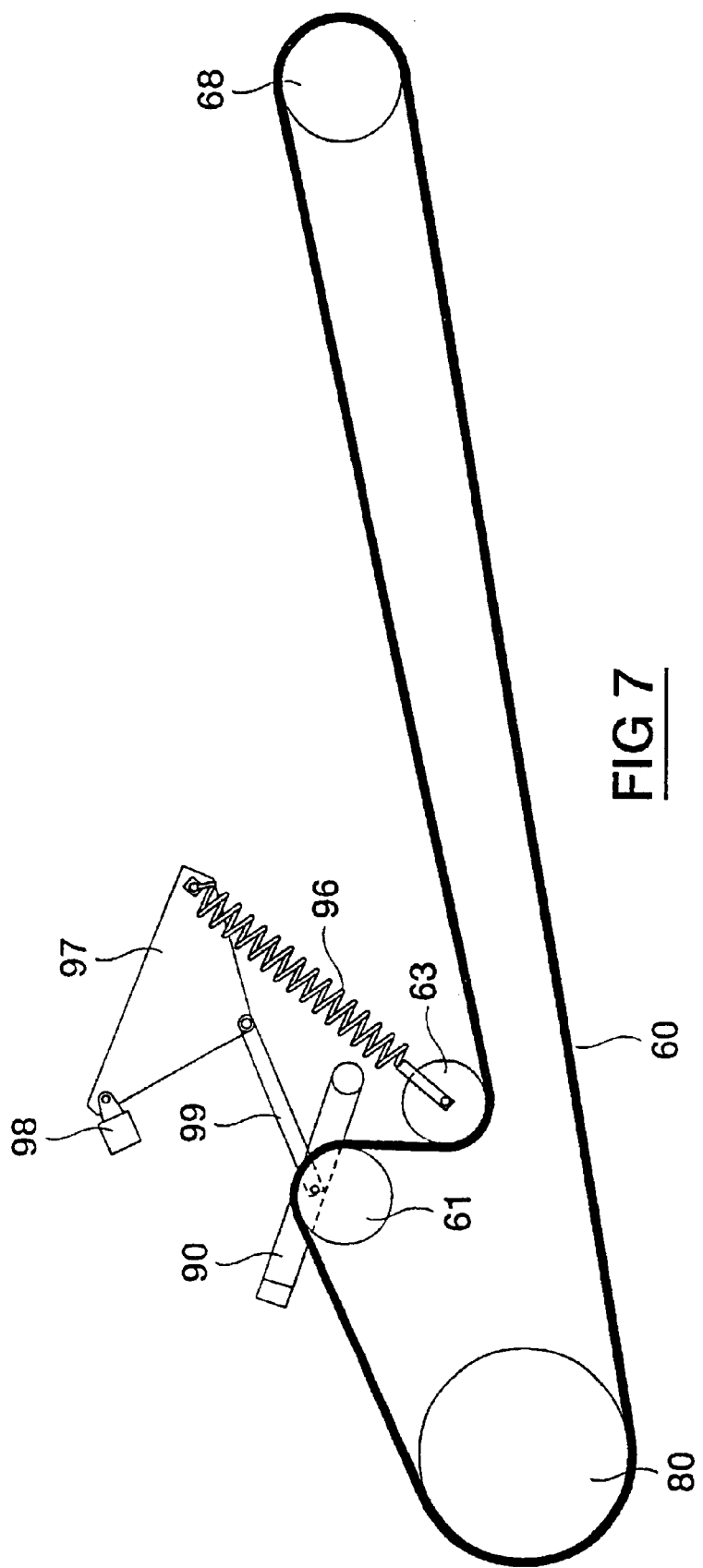

A suitable belt drive is shown in FIGS. 4 to 8. FIGS. 4 and 6 show the crop processor in the engaged position (similar to FIG. 2). FIGS. 6 and 7 show certain components required to tension a belt drive 60 in more detail, whereas FIGS. 4 and 5 show the general mechanical arrangement. The main belt drive 60 is driven by a pulley 68 secured to the axle of the main drive unit 78 of the forage harvester. The belt 60 runs over a pulley 61 attached to the axle 79 of the blower 51 for driving the blower 51 and over pulley 80 which is attached to the central axis of the cutterhead 36 for driving the latter. A spring loaded idler roller 63 keeps the belt 60 under tension. A secondary belt drive 66 drives the functional unit of the crop processor rolls 57 and the blower 51. The secondary belt 66 runs over pulley 62 attached to the central axle 79 of the blower 51. Belt 66 is driven by the blower 51. Belt 66 also runs over drive pulleys 67, 69 on crop processor rolls 57. A pulley 69 on one of the rolls 57 is driven by the inner surface of belt 66 whereas the pulley 67 on the other processor roll 57 is driven by the outer surface of the belt 66 in order to produce counter-rotation of the two processor rolls 57. Belt 66 is tensioned by a spring loaded idler roller 65 and kept in engagement with pulley 67 by the stationary idler roller 64. As shown best in FIG. 6, idler roller 65 is forced downwardly by compression spring 96 via a triangular load member 97. The load member 97 is pivotally attached at its front corner to a transverse beam 98 of the main frame 1 and a pull rod 99 links its lower corner to the strut 90 of the pivotable frame 53. When this frame 53 is moved forward or rearwardly, the load member 97 is moved in unison therewith by the pull rod 99 (seed FIGS. 6 and 7).

As shown in FIGS. 5 and 7, the pulley system 62, 64, 67, 69 moves en bloc as the frame 53 is rotated about the stub shafts 58 to bring the crop processor rolls 57 out of the crop path. In order to maintain tension in the main belt 60, spring loaded pulley 63 moves downwards to take up the slack caused by the change of position of pulley 61. Because of the simultaneous movement of the load member 97, the distance between the connection points of the compression spring 96 is maintained such that the force of the idler roller on the belt drive 60 does not vary, notwithstanding the displacement of the blower pulley 61. Thus, in accordance with an embodiment of the present invention there is provided a mechanism 96, 97, 99, 63 for maintaining the tension in the belt drive 60 substantially constant as the processing unit of blower and crop processor rolls is moved from the first to the second position and vice-versa. Accordingly, changing of the belts 60, 66 is not required and the movement of the frame 53 may be actuated from the drive cab of the forage harvester or from the cab of the towing vehicle if the forage harvester is not self-propelled. In addition, the drive capacity of the belt drive 60 (determined to an extent by the tension in the belt 60) is not influenced by the position of the crop processor and blower unit.

Figure 8:
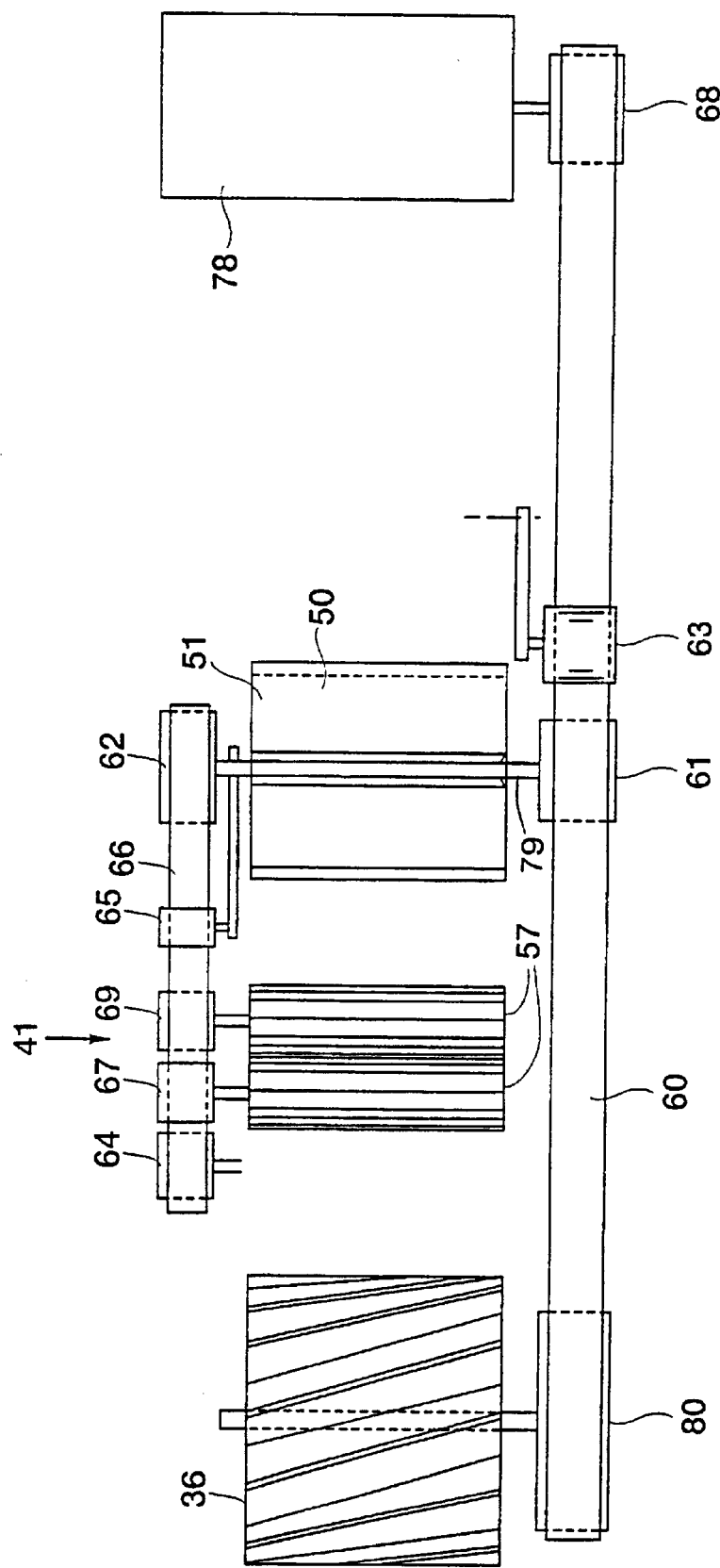
FIG. 8 is a schematic top view of the drive system for the forage harvester in accordance with an embodiment of the present invention.

FIG. 8 shows a schematic top view of the drive system with details of frames etc. removed for clarity purposes. Along one side of the forage harvester a main belt drive 60 is provided which provides the main power to the cutterhead 36 and the blower rotor 51. This belt drive 60 is tensioned by an idler roller 63. A drive sub-system is provided for driving the crop processor rolls 57 from the axle 79 of the blower rotor 51. This may also be a belt drive 66 which is tensioned by the idler roller 65. The crop processor rolls 57 and the blower rotor 51 are interchangeable in the crop flow as one operational processing unit while maintaining the primary drive 60 and the sub-system drive 66 operational during the change. The dimensions of pulleys 80, 67, 69, 62 and 61 are chosen so that there is always enough capacity at any stage in the crop processing to transport the crop to the next stage.

The present invention may provide the following advantages:

Very simple and quick system to engage or disengage the crop processor function.

The distance between the functional components that contribute to the transport and evacuation of the chopped crop is always minimal, thus optimising the acceleration and transport of the chopped crop from the cutterhead to the trailer and minimising the risk for blockage of the crop in the transport channel.

The intermediate shaft can be used as drive shaft for both the accelerator and crop processor. As the relative distance between the centre of the intermediate shaft, the accelerator shaft and the crop processor roll shafts remains the same in both operating positions, an easy and simple drive system can be developed that keeps driving all these components in both positions. The intermediate shaft is preferably the drive shaft of the blower.

Another advantage of the above mentioned drive system is that in the operating position as shown in FIGS. 3 and 5, the crop processor rolls continue to be driven, thus avoiding damage to the crop processor roll bearings when the crop processor is stationary but still subject to vibration. Such vibration drives the hardened balls of the ball races of the crop processor bearings into their seating reducing the life of these bearings considerably. To avoid this problem the crop processor assembly used to be taken out of the forage harvester. The present invention allows the crop processor to remain in the harvester (thus saving time at the changeover) but without damaging the roller bearings thereof in subsequent use.

Both guide plates 55, 56 automatically close the channel between cutterhead and accelerator in both operating positions, thus avoiding manual intervention of the driver when changing from one operating position to the other.

In the position as outlined in FIG. 3, the components of the crop processor unit are easily accessible for maintenance or removal out of the forage harvester.

While the invention has been shown and described with reference to preferred embodiments, it will be understood by those skilled in the art that various changes or modifications in form and detail may be made without departing from the scope and spirit of this invention as defined by the claims.

What is claimed is:

1. A forage harvester for handling crop material including kernels, the forage harvester comprising:

a cutter unit for comminuting said crop material; and a processing unit which is movable between a first and a second position, said unit comprising:

a crop processor unit disposed adjacent said cutter unit for receiving comminuted crop material from the cutter unit and cracking kernels in the crop material when said processing unit is in said first position, and disposed remote from said cutter unit for letting the comminuted crop material from the cutter unit bypass the crop processor unit when said processing unit is in said second position;

a blower unit for accelerating the processed crop material towards a subsequent handling apparatus, the blower unit being disposed for receiving the processed crop material directly from the crop processor unit when the processing unit is in said first position and for receiving the crop material directly from the cutter unit when the processing unit is in the second position; and a first drive power connection from a power unit for providing drive power to at least one of the blower unit and the crop processor unit, the power unit comprising a belt drive remote from the processing unit, characterized in that:

said movable processing unit further comprises a frame which is rotatably journalled at one point, said blower unit being mounted to said frame; said crop processor unit mounted to said movable frame;

said frame being connected to said crop processor unit for moving therewith as the processing unit is moved from the first to the second position;

a housing surrounding both the blower unit and the crop processor unit when the processor unit is in the first position;

a second drive power connection for providing drive power to the other one of the blower unit and the crop processor unit; and said first drive power connection to the at least one of the blower unit and the crop processor unit is operable to remain substantially operational as the processing unit is moved from the first to the second position.

2. The harvester according to claim 1, further comprising a mechanism having an idler roller for maintaining the tension in the belt drive substantially constant when the processing unit is moved from the first to the second position.

3. A forage harvester for handling crop material including kernels, the forage harvester comprising:

a cutter unit for comminuting said crop material; and a processing unit which is movable between a first and a second position, said unit comprising:

a crop processor unit disposed adjacent said cutter unit for receiving comminuted crop material from the cutter unit and cracking kernels in the crop material when said processing unit is in said first position, and disposed remote from said cutter unit for letting the comminuted crop material from the cutter unit bypass the crop processor unit when said processing unit is in said second position;

a blower unit for accelerating the processed crop material towards a subsequent handling apparatus, the blower unit being disposed for receiving the processed crop material directly from the crop processor unit when the processing unit is in said first position and for receiving the crop material directly from the cutter unit when the processing unit is in the second position; and a first drive power connection from a power unit for providing drive power to at least one of the blower unit and the crop processor unit, the power unit comprising a belt drive remote from the processing unit, said drive belt driving a pulley on a drive shaft of the blower unit, characterized in that:

said belt drive drives an intermediate shaft that is a drive shaft of said blower unit;

said movable processing unit further comprises a frame which is rotatably journalled at one point, said blower unit being mounted to said frame;

said frame being connected to said crop processor unit for moving therewith as the processing unit is moved from the first to the second position;

a housing surrounding both the blower unit and the crop processor unit when the processor unit is in the first position; and said first drive power connection to the at least one of the blower unit and the crop processor unit is operable to remain substantially operational as the processing unit is moved from the first to the second position.

4. The harvester according to claim 3 characterized in that the blower unit has a drive shaft and the crop processor unit has two drive shafts and the axes of all the drive shafts are parallel.

5. The harvester according to claim 4, wherein the distance from the output of the cutter unit to the input of the crop processor unit when the processing unit is in the first position is substantially the same as the distance from the output of the cutter unit to the input of the blower unit when the processing unit is in the second position.

6. The harvester according to claim 5, wherein when the processing unit is in the second position, a guide plate is located so that the crop processor unit is isolated from the crop path between the cutter unit and the blower unit.

\* \* \* \* \*